UNITED STATES PATENT OFFICE.

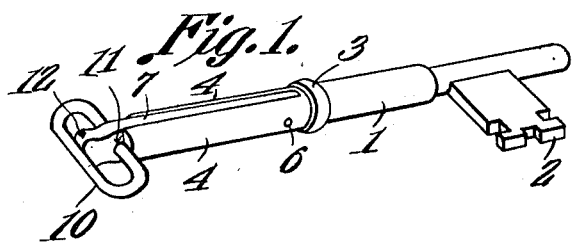
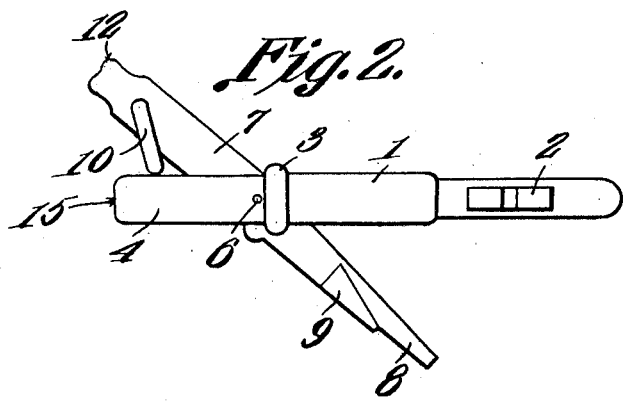

FRED C. ECKERT, OF WAUKESHA, WISCONSIN.

KEY.

1,020,892.

Specification of Letters Patent. Patented Mar. 19, 1912.

Application filed July 28, 1911. Serial No. 641,047.

*To all whom it may concern:*

Be it known that I, FRED C. ECKERT, a citizen of the United States, residing at Waukesha, in the county of Waukesha and State of Wisconsin, have invented a new and useful Key, of which the following is a specification.

The device forming the subject matter of this application is a key, adapted to be employed upon the locks of doors and similar structures, the key being so constructed that the movable portion thereof may be manipulated to engage with the lock, thereby preventing a felonious or unauthorized manipulation of the key, from the ward-bearing end therefrom.

The invention aims to provide a key having a tiltable guard of novel and improved form, and to provide novel means for locking the said guard in position to engage with the lock.

With the foregoing and other objects in view which will appear as the description proceeds, the invention resides in the combination and arrangement of parts and in the details of construction hereinafter described and claimed, it being understood that changes in the precise embodiment of invention herein disclosed can be made without departing from the spirit of the invention.

In the accompanying drawings,—Figure 1 shows the invention in perspective, the guard being alined with the shank of the key; Fig. 2 is a side elevation showing the guard angularly disposed with respect to the shank of the key, the guard being locked in the position which it will assume when in engagement with the lock; Fig. 3 is a sectional side elevation showing the guard in place within the shank of the key; and Fig. 4 is a sectional side elevation of that end of the key which carries the locking member whereby the guard is held in angular relation with respect to the shank of the key. Fig. 5 is a transverse section on the line A—B of Fig. 3.

In carrying out the invention, there is provided a key shank 1, having the usual ward 2. The shank 1 of the key is surrounded by a rib 3, having functions which will be set forth hereinafter. That end of the shank 1 which is remote from the ward 2 is longitudinally slotted, to form arms 4. In one side of the shank 1 of the key, there is a diagonal slot 5, opening between the arms 4. Through the arms 4, a pivot pin 6 is inserted. The pivot pin 6 constitutes a fulcrum for the guard 7, which is located between the arms 4. One end of the guard 7 is tapered, as shown at 8, so as to fit in the slot 5. The guard 7 moves freely between the arms 4, and its tapered end 5 moves freely in the slot 5. In order to retain the guard 7 alined with the shank 1, the tapered end 8 of the guard is equipped with laterally outstanding shoulders 9, adapted to engage with both walls of the slot 5, so as to hold the guard 7 alined with the shank 1; the guard 7 being readily tilted, however, into angular relation with respect to the shank 1, as shown in Fig. 2. That the end of the guard 7 which is remote from the ward 2 is equipped with a tiltable member 10, preferably taking the form of a ring, the ends of which are pivotally mounted in the guard 7, as shown at 11. The ring 10 is adapted to be swung across the end of the guard 7, as shown in Figs. 1 and 4, and in order to maintain the ring 10 thus positioned, and alined with the body portion of the key, the end of the guard 7 is equipped with an outstanding projection 12, adapted to serve as a stop for the ring 10, as Figs. 1 and 4 will make manifest.

The ring 10 is flattened on one side as denoted by the numeral 14. When the intermediate portion of the ring 10 is extended across the end of the guard 7, as shown in Fig. 1, and in abutment with the shoulder 12, the flat side 14 of the ring 10 will be engaged with the straight end edges 15 of the arms 4. The ring 10 will thus be held alined with the shank 1 until the guard 7 is tilted, withdrawing the edges 14 and 15 from engagement. The edges 14 are sufficiently short so that the edge 14 of this ring 10 will move over the corners 16 of the arms 4.

In practical operation, the ward 2 is inserted into the lock, and the bolt of the lock is thrown in the usual manner, the parts of the key being positioned as shown in Fig. 1. After the bolt has been thrown, the guard 7 is disposed in the angular position shown in Fig. 2, the tapered end 8 of the guard 7 engaging with the lock. The ring 10 is then swung out of engagement with the projection 12, and into engagement with one side of the bifurcated end of the shank 1, as clearly shown in Fig. 2, the guard 7 being maintained in outwardly projecting, lock-engaging relation with respect to the shank 1. The rib 3 prevents the insertion of an instrument alongside of the shank 1, for the purpose of manipulating the ring 10 and moving the guard 7 out of the position shown in Fig. 2.

Having thus described the invention, what is claimed is:—

1. A key comprising a shank; a guard pivoted intermediate its ends in the shank; and a tiltable member in the guard, adapted to engage with the shank, to maintain the guard in angular relation with respect to the shank.

2. A device of the class described comprising a shank; a guard pivoted intermediate its ends in the shank; and a ring pivoted in the guard and adapted to engage the shank, to maintain the guard in angular relation with respect to the shank, the ring being adapted to be swung over one end of the guard, there being a projection upon said end of the guard, adapted to receive the ring, to maintain the same alined with the guard.

3. A device of the class described comprising a shank bifurcated to form spaced arms and provided with a slot opening between the arms; a guard pivoted between the arms and adapted to move freely beneath the arms, and to register at one end in the slot; the guard having outstanding friction ribs, adapted to engage with the shank, to maintain the guard alined with the shank; and a tiltable member carried by the guard, and adapted to engage the shank, to hold the guard at an angle to the shank.

4. In a device of the class described, a shank; a guard pivoted between its ends in the shank; a ring pivoted in the guard and adapted to be swung into engagement with the shank to maintain the guard at an angle to the shank; the ring having a flat side engageable by the end of the shank, to hold the ring alined with the shank.

5. In a device of the class described, a shank; a guard pivoted between its ends in the shank; a ring pivoted in the guard and adapted to be swung into engagement with the shank to maintain the guard at an angle to the shank; the ring having a flat side engageable by the end of the shank, to hold the ring alined with the shank; there being a projection upon the end of the guard to receive the ring, when the ring is alined with the shank.

In testimony that I claim the foregoing as my own, I have hereto affixed my signature in the presence of two witnesses.

FRED C. ECKERT.

Witnesses:
T. C. MARTIN,
G. HOLMES DANBUER.

---

Copies of this patent may be obtained for five cents each, by addressing the "Commissioner of Patents, Washington, D. C."